United States Patent
Urabe

(10) Patent No.: US 7,009,337 B2
(45) Date of Patent: *Mar. 7, 2006

(54) EL PHOSPHOR POWDER AND EL DEVICE

(75) Inventor: Shigeharu Urabe, Minami-ashigara (JP)

(73) Assignee: Fuji Photo Film Co., Ltd, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/820,724

(22) Filed: Apr. 9, 2004

(65) Prior Publication Data

US 2004/0234747 A1 Nov. 25, 2004

Related U.S. Application Data

(63) Continuation-in-part of application No. 10/682,532, filed on Oct. 10, 2003, now Pat. No. 6,924,592.

(30) Foreign Application Priority Data

Oct. 10, 2002 (JP) .............................. 2002-297228

(51) Int. Cl.
*H05B 33/14* (2006.01)
*C01G 9/08* (2006.01)

(52) U.S. Cl. ................ 313/503; 313/502; 313/301.6 S; 313/301.4 H; 428/917

(58) Field of Classification Search ................ 313/502, 313/503, 506; 428/690, 917; 252/301.4 H, 252/301.6 R, 301.6 S; 315/169.3
See application file for complete search history.

(56) References Cited

U.S. PATENT DOCUMENTS 5,644,193 A * 7/1997 Matsuda et al. ............ 313/486

FOREIGN PATENT DOCUMENTS

| JP | 8-183954 A | 7/1996 |
| JP | 11-193378 A | 7/1999 |

* cited by examiner

*Primary Examiner*—Ashok Patel
(74) *Attorney, Agent, or Firm*—Sughrue Mion, PLLC

(57) ABSTRACT

Disclosed is EL phosphor powder which contains phosphor particles that comprise zinc sulfide as the matrix thereof and contain an activator and a co-activator, wherein at least 30% of the projected area of the phosphor particles contained in the EL phosphor powder are those having an aspect ratio (length of major axis/length of minor axis) of at least 1.5. The EL phosphor powder emits light of higher brightness.

11 Claims, No Drawings

EL PHOSPHOR POWDER AND EL DEVICE

This application is a continuation-in-part of Ser. No. 10/682,532 filed Oct. 10, 2003 now U.S. Pat. No. 6,924,592. The present application claims priority under 35 U.S.C. §119 of Japanese Patent Application No. 297228/2002 filed Oct. 10, 2002.

BACKGROUND OF THE INVENTION

1. Technical Field

The present invention relates to electroluminescent (this is herein abbreviated to "EL") phosphor powder that comprises zinc sulfide as the matrix thereof and contains both an activator and a co-activator to be the radiative recombination center thereof, and to a bright and long-life EL device that comprises the powder.

2. Background Art

An EL device emits light when excited by electric power, for which known are a dispersion-type EL element where phosphor powder is sandwiched between electrodes, and a thin film-type EL element. Generally, a dispersion-type EL device is so designed that a dispersion of phosphor powder in a binder having a high dielectric constant is sandwiched between two electrode sheets at least one of which is transparent, and this emits light when an alternating current is applied between the two electrodes. The EL device that comprises such EL phosphor powder has many advantages in that it may be thinned to have a thickness of a few mm or less and, since it is a surface-emitting device, it does not generate heat and its light emission efficiency is high. Therefore, EL devices are expected to have many applications for traffic sings, lighting equipment for various interiors and exteriors, light sources for flat panel displays such as liquid-crystalline displays, lighting equipment for large-area advertising pillars, etc.

EL phosphor powder well known in the art comprises zinc sulfide as the matrix thereof, along with an activator such as copper (metal ion serving as a radiative combination center) and a co-activator such as chlorine added thereto. However, the light-emitting device that comprises the phosphor powder has some drawbacks in that its brightness is low and its light emission life is short, as compared with those of light-emitting devices based on any other principle, and therefore, various improvements have heretofore been made on the phosphor powder.

Regarding the structure of phosphor particles that enable light emission of high brightness, JP-A 8-183954 (pp. 3–4, FIG. 1) discloses zinc sulfide phosphor particles that are characterized in that they have real stacking defects of high density uniformly and everywhere in each particle and the mean spacing of the stacking defects is from 0.2 to 10 nm. This says as follows: In the particles, copper ions serving as an activator are localized in the stacking defects of the matrix crystal of zinc sulfide, and they form conductive layers. Accordingly, when a voltage is applied thereto, the particles may release electrons and holes at high efficiency, and therefore enable light emission of high brightness.

On the other hand, using a single crystal of zinc sulfide, the relationship between the light-emitting mechanism and the structure of the crystal particles has been studied in detail. In particular, an important conclusion has been obtained for the relationship between the direction of the electric field applied to them and the orientation of the phosphor particles (*Physical Review* 149–158, Vol. 125, No. 1 (1962), page 150, FIG. 1). Specifically, when the direction of the electric field applied to them and the (111) face of the zinc sulfide phosphor particle are parallel to each other, then the brightness of light from the particles is the maximum.

When single-crystal zinc sulfide is used, the direction of the electric filed to be applied to it and the crystal orientation may be controlled. However, in a dispersion of fine particles, the individual phosphor particles are randomly dispersed, and the dispersion will be applied to a substrate by printing (or coating) thereon. In this case, therefore, when an electric field is applied to them, the individual phosphor particles are randomly oriented relative to the electric field, and, as a result, only a part of the particles could emit light at high efficiency.

Taking the prior art problems into consideration, the present invention is to provide an EL device of high brightness sufficient for light emission and to provide an EL phosphor powder for it.

SUMMARY OF THE INVENTION

For increasing the brightness of an EL device that comprises a zinc sulfide phosphor dispersed between electrodes, it is important that the individual phosphor particles may uniformly emit bright light. In order to make the individual phosphor particles uniformly emit bright light, it is necessary that, when a certain electric field is applied to the EL device, the individual phosphor particles are so oriented that they may emit bright light. However, conventional phosphor particles could not be oriented in a predetermined direction. Given that situation, we, the present inventors have assiduously studied so as to make phosphor particles oriented in a predetermined direction, and, as a result, have found that, when EL phosphor powder that contains at least a predetermined amount of phosphor particles having an aspect ratio (length of major axis/length of minor axis) of at least 1.5 is used, then the phosphor particles may be oriented in a desired direction. Specifically, we have found that, when a dispersion of the EL phosphor powder of the invention is applied onto a support to be an electrode and dried thereon, then the major axis of each phosphor particle can be oriented in the direction parallel to the support. The phosphor particles have real defects (dislocations existing in and on twin planes) vertically to the major axis, and therefore, when an electric field is applied to them vertically to the surface of the support coated with the phosphor powder dispersion, then the real defects are oriented to be parallel to the electric field and the phosphor powder may therefore emit bright light.

Having the constitution mentioned below, the present invention has been provided on the basis of these findings.

(1) EL phosphor powder which contains phosphor particles that comprise zinc sulfide as the matrix thereof and contain an activator and a co-activator, wherein at least 30% of the projected area of the phosphor particles contained in the EL phosphor powder are those having an aspect ratio (length of major axis/length of minor axis) of at least 1.5.

(2) The EL phosphor powder of above (1), wherein at least 50% of the projected area of the phosphor particles contained in the EL phosphor powder are those having an aspect ratio (length of major axis/length of minor axis) of at least 1.5.

(3) The EL phosphor powder of above (1), wherein at least 70% of the projected area of the phosphor particles contained in the EL phosphor powder are those having an aspect ratio (length of major axis/length of minor axis) of at least 1.5.

(4) The EL phosphor powder of any one of above (1) to (3), wherein the mean aspect ratio (length of major axis/ length of minor axis) of the phosphor particles having an aspect ratio (length of major axis/length of minor axis) of at least 1.5 is at least 2.

(5) The EL phosphor powder of any one of above (1) to (3), wherein the mean aspect ratio (length of major axis/length of minor axis) of the phosphor particles having an aspect ratio (length of major axis/length of minor axis) of at least 1.5 is at least 3.

(6) The EL phosphor powder of any one of above (1) to (5), wherein the EL phosphor particles have real stacking defects and the mean spacing of the stacking defects is from 0.5 to 20 nm.

(7) The EL phosphor powder of any one of above (1) to (6), wherein the activator is at least one ion selected from the group consisting of copper, manganese, silver, gold and rare earth elements.

(8) The EL phosphor powder of any one of above (1) to (7), wherein the co-activator is at least one ion selected from the group consisting of chlorine, bromine, iodine and aluminium.

(9) The EL phosphor powder of any one of above (1) to (8), wherein the activator is copper ion and the co-activator is chloride ion.

(10) The EL phosphor powder of any one of above (1) to (9), wherein the mean length of the major axis of the EL phosphor particles having an aspect ratio (length of major axis/length of minor axis) of at least 1.5 is at most 100 μm.

(11) An EL device comprising the EL phosphor powder of any one of above (1) to (10).

The EL phosphor powder of the invention emits light of higher brightness. The phosphor particles contained in it are readily oriented on a support, and the EL device that contains the EL phosphor powder of the invention enables light emission of high brightness.

BEST MODE FOR CARRYING OUT THE INVENTION

The EL phosphor powder and the EL device of the invention are described in detail hereinunder. In this description, the numerical range expressed by the wording "from a number to another number" means the range that falls between the former number indicating the lowermost limit of the range and the latter number indicating the uppermost limit thereof.

The EL phosphor powder of the invention contains phosphor particles that comprise zinc sulfide as the matrix thereof and contain both an activator (metal ion) and an co-activator to be the radiative recombination center thereof. Zinc sulfide includes two crystal morphologies. When grown at a high temperature (1024° C. or higher), it forms hexagonal crystals (wurtzite structure β-ZnS); but when grown at a temperature lower than it, the compound forms cubic crystals (zinc blend structure α-ZnS). For forming phosphor particles having an aspect ratio (length of major axis/length of minor axis) of at least 1.5, the crystal is preferably grown in the direction of the C axis of the hexagonal system thereof. For this, it is desirable that the starting fine particles of zinc sulfide (generally smaller than 3 μm) are fired at a high temperature of from 1020 to 1200° C. for 1 to 10 hours in the presence of a flux. In this step, smaller particles fuse while larger particles grow through Ostwald ripening, and, on the other hand, particles may aggregate together and adhere to each other and fuse together to grow. In the former case, the growth in the direction of the C axis of the hexagonal crystals may be promoted based on the crystal structure of the hexagonal system whereby particles having a large aspect ratio may be obtained. However, when the crystals grow according to the latter aggregation mechanism, then the aggregated crystals may be often amorphous even though they may have a wurtzite structure. To prevent the aggregation growth, a particle aggregation inhibitor is preferably added to the system being fired. The aggregation inhibitor for use in the invention is not specifically defined in point of its type, and it may be, for example, fine particles having a melting point higher than the firing temperature (1300° C.). Preferably, the particle size of the aggregation inhibitor is from 0.1 to 10 μm, more preferably from 0.5 to 5 μm. Preferred examples of the material of the aggregation inhibitor are metal oxides such as magnesium oxide, aluminium oxide, silicon oxide, zirconium oxide; nitrides such as silicon nitride, aluminium nitride; and carbides such as silicon carbide, tungsten carbide, tantalum carbide. For the details of this technique, for example, referred to are Table 1 and FIG. 2 in JP-A 11-193378 (pp. 4–5).

When fired in air, $MgCl_2$ is oxidized into MgO particles that are effective for preventing aggregation, and therefore its use is preferred in the invention.

In case where growing particles are prevented from aggregating together, then particles having a large aspect ratio (length of major axis/length of minor axis) may be obtained when the ratio of the growing speed of hexagonal phosphor crystal particles in the direction of the C axis thereof to the growing speed thereof in the direction vertical to the C axis direction (this is hereinafter referred to as "growing speed ratio") is enlarged. From this viewpoint, when fine particles of the starting material, zinc sulfide (generally smaller than 3 μm in size) are fired in the presence of a flux at a high temperature falling between 1020 and 1200° C. for 1 to 10 hours, then it is extremely important to surely understand the relationship between the growing speed ratio and the type of the flux for the purpose of obtaining particles having a large aspect ratio (length of major axis/length of minor axis). For example, KCl is preferred to $BaCl_2$ for the chloride flux. For the potassium salt flux, KI is preferred to KCl. To that effect, it is desirable that a substance capable of increasing the growing speed ratio exists in the growing system of hexagonal crystal particles (of wurtzite structure β-ZnS).

In this description, the major axis and the minor axis of the phosphor particles are defined as follows: When the phosphor particles are observed with a microscope (optical microscope or electronic microscope) in such a manner that they do not overlap with each other, the longest axis of the phosphor particle is referred to as a major axis thereof, and the axis that is perpendicular to it is referred to as a minor axis. The length of the minor axis of the phosphor particle is defined as the length of the shorter side of the rectangle the longer side of which corresponds to the major axis of the particle and the area is the same as the projected area of the particle.

In the invention, the sum total of the projected area of the particles having an aspect ratio (length of major axis/length of minor axis) of at least 1.5 is at least 30% of the sum total of the projected area of all the phosphor particles that constitute the phosphor powder. Preferably, the projected area of the particles having an aspect ratio (length of major axis/length of minor axis) of at least 1.5 is at least 50% of all the projected area, more preferably at least 70%. Regarding their shape, the phosphor particles that constitute the EL phosphor powder of the invention may be columnar, oval or pillar-shaped. Preferably, the particles having an aspect ratio (length of major axis/length of minor axis) of at least 1.5 selected from the phosphor particles of the invention have a mean aspect ratio (length of major axis/length of minor axis) of at least 2, more preferably at least 3.

The activator to be the radiative recombination center for the phosphor particles may be any and every one that is generally used as an activator for phosphors. For example, preferred for it are various metal ions of copper, manganese, silver, gold, rare earth metals, etc. Concretely, it is desirable that these elements are in the form of acetates, sulfates, etc. One or more of these may be used herein either singly or as combined. The wavelength (color) of fluorescence emission depends on the type of the activator. For example, fluorescence includes bluish green (copper), orange (manganese) and blue (silver). The preferred range of the concentration of the activator depends on the type thereof. For example, for the copper activator, its concentration may be from 0.01 to 0.1 mol % in terms of the copper concentration relative to the matrix, zinc sulfide in the final product.

Preferably, a flux is added to the phosphor particles of the invention.

Examples of the flux are alkali or alkaline earth metal halides, and ammonia halides. Concretely, the flux includes $MgCl_2$, BaCl2, $CaCl_2$, $NH_4Cl$, CsCl, NaCl, KCl, KBr, KI and NaI. As combined, two or more of these may be added to the particles. The flux assists the crystal growth of the matrix, zinc sulfide, and serves as the source of the co-activator. It is desirable that the total amount of the flux to be added is from 5 to 100 mol %, preferably from 8 to 70 mol %, more preferably from 10 to 70 mol % relative to the starting material, zinc sulfide. Preferably, a flux capable of providing ions of at least one selected from chlorine, bromine, iodine and aluminium for the co-activator is used herein.

A preferred method for producing the EL phosphor powder of the invention is described concretely hereinunder.

Powder that contains the above-mentioned starting materials and an activator is well mixed and fired for primary firing at 1000 to 1300° C. for 3 to 10 hours. The intermediate phosphor powder thus obtained through the primary firing is in the form of lumps of brittlely bonded fired powder, and when it is put into water, then it is readily broken and the fired powder disperses in water. When the lumps are not readily broken, temperature of the water used should be increased. The fired powder is repeatedly washed with ion-exchanged water to thereby remove the alkali metal or alkaline earth metal and the excessive activator and co-activator.

Inside the intermediate phosphor powder thus obtained through the primary firing, there exist naturally-occurred stacking defects (twin crystal structure) though their density is low. However, these are still insufficient for high-efficiency light emission from the powder. Therefore, some impact force is applied to the powder so as to significantly increase the density of the stacking defects, not destroying the particles. For imparting the impact force thereto, for example, heretofore known is a method of contacting and mixing the intermediate phosphor particles together, or a method of mixing them along with beads of alumina or the like (ball milling), or a method of accelerating the particles to make them collide against a hard plate or with each other (see JP-A 6-306355, pp. 3–4, Tables 1–3; JP-A 9-59616, pp. 4–5, FIGS. 1, 2).

Next, the thus-obtained intermediate phosphor powder is fired for secondary firing. In the secondary firing, the powder is annealed at a temperature lower than that in the primary firing, 500 to 800° C. The period of the firing is preferably 1 to 10 hours, more preferably 2 to 8 hours.

Through the annealing, the hexagonal intermediate phosphor crystals are transformed into cubic crystals. The hexagonal crystals formed in the previous step have many defects (dislocations) owing to the impact force applied thereto in that step, and the crystal transformation occurs predominantly in the defects in the secondary firing. Accordingly, high-density interfaces are formed between the hexagonal crystals and the cubic crystals, and, as a result, high-density twin planes are introduced into the thus-annealed crystals. This may be confirmed through TEM observation of the cross section of the phosphor particle that shows a large number of parallel twin planes existing in each particle. It is believed that the activator such as copper ion that has been uniformly doped into the particles through the primary firing may move and concentrate in the twin planes that contain the defects in the secondary firing, and it may form conductive layers in these.

After this, the intermediate phosphor is etched with an acid such as HCl to remove the metal oxide adhering to the surface thereof, and this is then washed with KCN to remove copper sulfide adhering to the surface thereof. Next, the intermediate phosphor is dried to obtain EL phosphor powder. This is dispersed in an organic binder, and the resulting dispersion is applied onto a support to form a phosphor layer thereon.

The phosphor layer is disposed between a reflective insulating layer of a back electrode and a transparent electrode to construct an electroluminescent device, which is then sealed up with a casing film to complete an electroluminescent lamp. When a voltage is imparted between the two electrodes, the phosphor in the phosphor layer emits light owing to the high electric field formed between the electrodes. When the phosphor particles are in an electric field, the electric field concentrates in the conductive layers in which the copper ions in the particles are localized, and the intensity of the electric field increases extremely therein. As a result, electrons and holes are generated from the conductive layers and are recombined by the actions of the activator and the co-activator to thereby emit light. In the EL device of the type, it is extremely important to efficiently effect the electron generation. According to the invention, since the electric field is applied to the EL device in such a manner that it may be parallel to the twin planes that include the defects with copper ions localized therein, the electron generation in the device may be effected at high efficiency. If the phosphor particle orientation is at random as in conventional EL devices, only the particles of which the twin planes are parallel to the electric field applied thereto could generate electrons at high efficiency and therefore enable light emission of high brightness, but those of which the twin planes are not parallel to it could not enjoy an increase in the electric field around their defects and therefore their electron and hole generation efficiency is low. When the twin planes are perpendicular to the electric field applied to the particles, then little electron and hole generation may be expected and no light emission could be therefore expected.

For realizing the phosphor layer in which the phosphor particles are oriented relative to the support, it is desirable that phosphor particles are dispersed in a binder dissolved in water or organic solvent and the dispersion is applied onto an insulating reflective layer or a transparent electrode surface and dried thereon. In the drying step, when the film thickness change (decrease) is larger, then the particles may be oriented better. For increasing the film thickness change in the drying step in the invention, the ratio by weight of solvent/binder is preferably at least 5, more preferably at least 8, even more preferably at least 10. In conventional techniques of the related art, the amount of the solvent to be used is reduced as much as possible for reducing the drying load. It is sure that the amount of the solvent is as small as possible in view of the production efficiency and the production costs, but the ratio by weight of solvent/binder is as big as possible in view of brightness of EL devices.

According to the method of producing the EL device mentioned above, the phosphor particles having an aspect ratio of at least 1.5 can be oriented in parallel to the electrode that serves as a support for them. In this description, the parallel orientation means that the major axis of the phosphor particle is oriented at an angle not larger than 30° relative to the electrode face. In the invention, it is desirable that at least 50%, more preferably at least 70%, even more preferably at least 90% of all the phosphor particles having an aspect ratio of at least 1.5 are oriented at an angle not larger than 30° relative to the electrode. The orientation condition of the phosphor particles can be readily recognized through observation with TEM (transmission electronic microscope) or SEM (secondary electronic microscope) of an ultra-thin cross section of the EL device prepared by the use of a microtome.

The phosphor particles having a larger aspect ratio (length of major axis/length of minor axis) are more readily oriented, and the phosphor particles of the invention preferably have an aspect ratio (length of major axis/length of minor axis) of at least 2, more preferably at least 3.

Hydrothermal synthesis is preferred for the preparation of zinc sulfide phosphor particles. In a hydrothermal reaction system for them, particles are dispersed in a well-stirred aqueous solvent, and the zinc ion and/or the sulfur ion to cause the growth of the particles are fed into the system from outside of the reactor within a predetermined period of time at a controlled flow rate of their aqueous solutions. Accordingly in the system, the particles can move freely in the aqueous solvent, and the ions added thereto diffuse in water to cause uniform growth of the particles, and, as a result, the concentration distribution of the activator or the co-activator inside the particles may be varied. Hydrothermal reaction therefore gives specific particles that could not be obtained in a firing process. In addition, in controlling the particle size distribution in the system, the nucleation step and the step of particle growth may be clearly differentiated from each other, and the particle size distribution can be controlled by freely controlling the degree of supersaturation during particle growth, and monodispersed zinc sulfide particles having a narrow particle size distribution can be obtained. Preferably, the process includes an Ostwald ripening step between the nucleation step and the step of particle growth for more readily controlling the particle size and for realizing a multiple twin-crystal structure for the particles. ZnS crystal has an extremely low solubility in water, and it is an extremely disadvantageous property for growing the particles through ionic reaction in an aqueous solution. The solubility in water of ZnS crystal increases with the increase in the temperature of the resulting solution. However, at 375° C. or higher, water is in a supercritical state, and the ion solubility therein greatly reduces. Accordingly, the temperature for preparation of the particles preferably falls between 100° C. and 375° C., more preferably between 200° C. and 375° C. The time for preparation of the particles is preferably within 100 hours, more preferably from 5 minutes to 12 hours. Another preferred method for increasing the solubility of ZnS in water is to use a chelating agent. For the chelating agent for Zn ion, preferred are those having an amino group or a carboxyl group. Concretely mentioned are ethylenediaminetetraacetic acid, N,2-hydroxyethylethylenediamine-triacetic acid, diethylenetriamine-pentaacetic acid, 2-aminoethyl-ethylene glycol-tetraacetic acid, 1,3-diamino-2-hydroxypropane-tetraacetic acid, nitrilotriacetic acid, 2-hydroxyethyliminodiacetic acid, iminodiacetic acid, 2-hydroxyethylglycine, ammonia, methylamine, ethylamine, propylamine, diethylamine, diethylenetriamine, triaminotriethylamine, allylamine, ethanolamine. Not using a precursor of the constituent elements, when a constitutive metal ion and a chalcogen anion are reacted in a mode of direct precipitation reaction, then the solutions of the two must be rapidly mixed. For it, for example, a double-jet system mixer is preferred.

As another method forming the phosphor usable in the invention, also preferred is an urea melt method. In the urea melt method, an urea melt is used as a medium in producing phosphor. Briefly, urea is kept melted at a temperature not lower than the melting point thereof, and substances that contain elements for forming a phosphor matrix and an activator are dissolved in the urea melt. In this stage, if desired, a reactive agent is added to it. For example, a sulfur source such as ammonium sulfate, thiourea or thioacetamide is added to cause precipitation reaction. The resulting flux is gradually heated up to 450° C. or so, and a solid of phosphor particles or phosphor intermediate uniformly dispersed in the urea-derived resin can be obtained. The solid is ground into powder, and then fired in an electric furnace where the resin is pyrolyzed. The firing atmosphere may be any of inert atmosphere, oxidizing atmosphere, reducing atmosphere, ammonia atmosphere or vacuum atmosphere. Depending on the atmosphere selected, obtained are phosphor particles with a matrix of oxide, sulfide or nitride.

As still another method for forming the phosphor usable in the invention, also preferred is a method of spray pyrolysis. Briefly, a phosphor precursor solution is sprayed into fine droplets through an atomizer, and phosphor particles or phosphor intermediate are produced through condensation or chemical reaction inside the droplets or through chemical reaction with the atmosphere vapor around the droplets. When the condition for forming the droplets is optimized, then it is possible to obtain fine spherical particles having a homogenized minor impurity and having a narrow particle size distribution. The atomizer to be used herein for forming such fine droplets is preferably a two-fluid nozzle atomizer, an ultrasonic atomizer, or an electrostatic atomizer. The fine droplets formed through the atomizer are led into an electric furnace along with a carrier gas thereinto, and heated therein, whereby the droplets are dewatered and condensed, and the substances in the droplets undergo chemical reaction with each other or are sintered, or are chemically reacted with the atmospheric vapor to give the intended phosphor particles or phosphor intermediate. The resulting particles may be additionally fired, if desired. For example, a mixture solution of zinc nitrate and thiourea is atomized, and pyrolyzed in an inert gas (e.g., nitrogen) at 800° C. or so to obtain spherical zinc sulfide phosphor particles. When a minor impurity such as Mn, Cu or rare earth elements is dissolved in the starting mixture solution, then it acts as a luminescence center of the phosphor particles.

For forming the phosphor usable in the invention, also employable are vapor-phase methods such as laser ablation, CVD, plasma CVD, sputtering, resistance heating, electron beam irradiation, fluidized oil face vapor-deposition or their combination; and liquid-phase methods such as double decomposition, precursor pyrolysis, reversed micellation, combination of any of these with high-temperature firing, freeze-drying, etc.

More preferably, the phosphor particles have a non-luminous shell layer on their surface. For forming the shell layer, it is desirable that the semiconductor particles prepared to be the core of phosphor particles are chemically processed to form the layer therein having a thickness of 0.01 $\mu$m or more. More preferably, the thickness of the layer is from 0.01 $\mu$m to 1.0 $\mu$m. The non-luminous shell layer may be formed of an oxide, a nitride or a nitroxide, or of a substance that has the same composition as that of the phosphor matrix but does not have a luminescent center. As the case may be, a substance having a different composition may be epitaxially grown on the phosphor matrix to form the shell layer.

For forming the non-luminous shell layer, employable are vapor-phase methods such as laser ablation, CVD, plasma CVD, sputtering, resistance heating, electron beam irradiation, fluidized oil face vapor-deposition or their combination; and liquid-phase methods and spray pyrolysis methods such as double decomposition, sol-gel conversion, ultrasonic chemical reaction, precursor pyrolysis, reversed micellation, combination of any of these with high-temperature firing, hydrothermal synthesis, urea melt precipitation, freeze-drying, etc. In particular, hydrothermal synthesis, urea melt precipitation and spray pyrolysis that are preferred for formation of phosphor particles are also preferred for forming the non-luminous shell layer. For example, when a non-luminous shell layer is formed to cover zinc sulfide phosphor particles according to hydrothermal synthesis, core particles of zinc sulfide phosphor are put into a solvent and suspended therein. In the same manner as that for particle formation, a solution that contains a metal ion to be the material for the non-luminous shell layer and optionally an anion is added to the resulting suspension from outside of the reactor within a predetermined period of time at a controlled flow rate of the solution. The contents of the reactor are fully stirred, whereby the particles can freely move in the solvent and the added ions can diffuse in the solvent to cause uniform growth of the particles. Accordingly, the core particles can be uniformly coated with the non-luminous shell layer. If desired, the particles are fired to be the intended zinc sulfide phosphor particles having a non-luminous shell layer on their surface. When a non-luminous shell layer is formed on the surface of zinc sulfide phosphor particles according to the urea melt precipitation method, zinc sulfide phosphor is added to an urea melt that contains a metal salt to be a material for the non-luminous shell layer. Zinc sulfide does not dissolve in urea. In the same manner as that for particle formation, the solution is heated to give a solid of zinc sulfide phosphor and the material for non-luminous shell layer uniformly dispersed in the urea-derived resin. The solid is ground into powder, and then fired in an electric furnace where the resin is pyrolyzed. The firing atmosphere may be any of inert atmosphere, oxidizing atmosphere, reducing atmosphere, ammonia atmosphere or vacuum atmosphere. Depending on the atmosphere selected, obtained are zinc sulfide phosphor particles coated with a non-luminous shell layer of oxide, sulfide or nitride. When a non-luminous shell layer is formed on the surface of zinc sulfide phosphor particles according to the spray pyrolysis method, zinc sulfide phosphor is added to a solution of a metal salt to be the material for non-luminous shell layer. The solution is atomized and pyrolyzed, whereby the intended non-luminous shell layer is formed on the surface of the zinc sulfide phosphor particles. The atmosphere for pyrolysis and the atmosphere for additional firing may be suitably selected, and depending on it, zinc sulfide phosphor particles coated with a non-luminous shell layer of oxide, sulfide or nitride may be obtained.

The EL device of the invention has a basic constitution that comprises a phosphor layer sandwiched between a pair of facing electrodes, at least one of which is transparent. Preferably, a dielectric layer is between the phosphor layer and the electrode. For the phosphor layer, employable is a dispersion of phosphor particles dispersed in a dispersant. The dispersant may be a polymer having a relatively high dielectric constant such as cyanoethyl cellulose resin; or any other resin such as polyethylene, polypropylene, polystyrene resin, silicone resin, epoxy resin or vinylidene fluoride resin. Particles such as $BaTiO_3$ or $SrTiO_3$ having a high dielectric constant may be suitably added to the resin for controlling the dielectric constant of the resin. For dispersing the phosphor particles in the dispersant, for example, employable are any of homogenizers, planetary kneaders, roll kneaders, ultrasonic dispersers.

For the dielectric layer, employable is any insulating material that has a high dielectric constant and a high dielectric breakdown voltage. It may be selected from metal oxides and nitrides including, for example, $TiO_2$, $BaTiO_3$, $SrTjO_3$, $PbTiO_3$, $KNbO_3$, $PbNbO_3$, $Ta_2O_3$, $BaTa_2O_6$, $LiTaO_3$, $Y_2O_3$, $Al_2O_3$, $ZrO_2$, AlON, ZnS. The layer may be a uniform film or may be a film having a particulate structure. The phosphor layer and the dielectric layer are preferably formed according to a method of spin coating, dipping, bar coating or spraying. Especially preferred for forming them are a method of screen printing in which the face to be printed is not specifically defined, and a continuously coating method of slide coating or the like. For example, according to the screen-printing method, phosphor particles or dielectric particles are dispersed in a polymer solution having a high dielectric constant and the resulting dispersion is applied onto a substrate through a screen mesh. The thickness and the pore size of the mesh and the coating frequency may be suitably determined to thereby control the thickness of the layer to be formed. By changing the dispersions to be applied, not only the phosphor layer and the dielectric layer but also back electrode layer may also be formed. In addition, by changing the size of the screen, a large-area layer may be readily formed. The dielectric layer may also be formed according to a vapor-phase method of sputtering of vacuum evaporation. In this case, the thickness of the layer to be formed may be generally from 0.1 $\mu$m to 1 $\mu$m.

For the transparent electrode to constitute the EL device of the invention, any ordinary transparent electrode material may be employed. For example, the material includes oxides such as tin-doped tin oxide, antimony-doped tin oxide, zinc-doped tin oxide; multi-layered structures with a thin silver film sandwiched between high-refractivity layers; and π-conjugated polymers such as polyaniline, polypyrrole. It will be desirable that the transparent electrodes are wired in a comb-like or grid-like wiring pattern to improve their conductivity. For the back electrode through which no light is taken out, any conductive material may be used. For example, it may be selected from metals such as gold, silver, platinum, copper, iron or aluminium, or graphite, depending on the shape of the device to be constructed and on the temperature and other conditions for the device construction. Anyhow, ITO and the like having conductivity may be used in forming the transparent electrode.

It is desirable that the EL device of the invention is finally sealed up with a suitable sealant material in order to protect it from the influence of humidity in external environments. When the substrate of the device has a satisfactory masking property, the upper part of the constructed device is covered with a masking sheet, and the periphery thereof is sealed up with a curable material such as epoxy resin. The masking sheet may be suitably selected from glass, metal and plastic films, depending on the object thereof.

Preferably, the phosphor layer in the EL device of the invention is thinner, and more preferably, its thickness is at most 15 μm. Also preferably, the phosphor layer contains phosphor particles that are in contact with a dielectric substance, and the total thickness of the phosphor particles-containing phosphor layer and an inorganic dielectric substance-containing insulating layer that is optionally adjacent to the phosphor layer is from 3 to 10 times the mean particle size of the phosphor particles. The contact of the phosphor particles with the dielectric substance means that the phosphor particles are completely or partly covered with a non-luminous shell layer. However, it also means that the phosphor particles is in mere contact with a dielectric substance. The lowermost limit of the device thickness is the phosphor particle size. However, in order to ensure the slidability of the device, it is desirable that the thickness of the size is from 3 to 10 times the size of the phosphor particles. The thickness of the device as referred to herein is meant to indicate the total thickness of the phosphor particles-containing phosphor layer sandwiched between electrodes and the inorganic dielectric layers adjacent thereto. Preferably, the phosphor layer and the dielectric layer may be formed in such a manner that the upper phosphor particles are partly covered with the dielectric layer, or that is, a part of the phosphor layer is overlapped with a part of the dielectric layer. In this embodiment, the contact point may be increased and the smoothness of the device surface may be bettered. The dielectric substance for use in the invention may be filmy crystals or granular particles, or may also be their combination. The dielectric substance-containing dielectric layer may be formed on one side of the phosphor layer, but is preferably formed on both sides of the phosphor layer. When the dielectric layer is a thin crystal layer, it may be formed on a substrate according to a vapor-phase process such as sputtering, or the layer may be a sol-gel film formed by-the use of an alkoxide of Ba or Sr. When the dielectric layer is formed of granular particles, it is desirable that the dielectric particles are much smaller than the phosphor particles. Concretely, it is desirable that the size of the dielectric particles is from 1/1000 to 1/3 of the size of the phosphor particles. When the EL device is thin and is excited in a high electric field, then it is important that the distance between the electrodes to carry the EL device therebetween is uniform. Concretely, when the electrode-to-electrode distance fluctuation is referred to in terms of the center line average height, Ra, then Ra is preferably at most (d×1/8) μm relative to the thickness of the phosphor layer, d μm.

The EL device of the invention is not specifically defined in point of its application. For example, when it is used as a light source, the color of the light to be emitted by it is preferably white. For white light emission, for example, preferably employed is a method of using a phosphor powder capable of emitting white light by itself, such as zinc sulfide phosphor powder activated with copper and manganese and gradually cooled after fired; or a method of mixing multiple phosphor powders that emit three primary colors or complementary colors (e.g., combination of blue-green-red, or combination of bluish green-orange). Also preferred is a method that comprises emitting short-wave light such as blue, and converting a part of the emitted light into green or red by the use of a fluorescent pigment or dye to thereby produce white light, as in JP-A 7-166161, 9-245511, 2002-62530. Regarding the CIE chromaticity coordinates (x, y) of the emitted light, it is desirable that the x value falls between 0.30 and 0.43 and the y value falls between 0.27 and 0.41.

In addition to the constitutive elements mentioned above, the EL device of the invention may have any other elements, such as substrate, transparent electrode, back electrode, various protective layers, filter, light-scattering reflection layer. The substrate is not limited to glass substrates and ceramic substrates. For flexible devices, for example, transparent resin sheets may also be used. In the invention, it is desirable that the phosphor particles and the EL device constitution having the characteristics mentioned above are suitably combined to provide bright and high-performance EL devices.

The invention is described more concretely with reference to the following Example and Comparative Example. Not overstepping the sprit and the scope of the invention, the materials and their amount and proportion, as well as the details and the order of the treatments in the following Example may be suitably varied. Accordingly, the scope of the invention should not be interpreted limitatively by the concrete examples mentioned below.

EXAMPLE 1

100 g of aggregate powder of zinc sulfide (ZnS) having a particle size of 2 μm (however, its primary particle size is about 0.01 μm) was well mixed with 0.1 mol % of copper sulfate ($CuSO_4$) serving as an activator to prepare a slurry, and the resulting mixture was heated and dried in an oven. Next, 67 g of α-alumina particles having a mean particle size of 0.6 μm (e.g., Sumitomo Chemical's "AKP-3000") were added to the mixture and mixed, and this was then further mixed with a flux comprised of 44 g of $BaCl_2.2H_2O$, 34.4 g of KI and 48 g of $MgCl_2.6H_2O$ added thereto. Next, the mixture was put into a quartz crucible, and fired in air at 1200° C. for 4 hours (first firing). After thus fired, this was washed a few times with deionized water and dried to obtain intermediate phosphor powder. To separate the phosphor particles from the alumina particles that constitute it, the intermediate phosphor powder was added to deionized water and ultrasonically stirred whereby the phosphor particles were mechanically separated from the alumina particles adhering to it. When the stirring was stopped, the alumina particles floated up while the intermediate phosphor particles precipitated in the bottom owing to the difference in the precipitating speed between the two types of the particles, and the upper alumina particles were removed. This operation was repeated a few times to completely remove the alumina particles, and then the phosphor particles were taken out and dried. Further dried, the phosphor particle powder was sieved through a 20-μm mesh sieve to thereby remove the alumina particle aggregates that had been formed during the firing operation.

Next, the thus-sieved phosphor particle powder was put into a magnetic pot along with alumina beads having a mean size of 0.5 mmφ, and milled at 100 rpm for 4 hours. In that manner, physical force was applied to the phosphor particles not grinding them, and crystal defects were thus introduced into the phosphor particles. The 0.5 mmφ alumina beads were removed by sieving, and the phosphor particles having the defects thus introduced thereinto were put into a quartz crucible and again fired therein at 700° C. for 6 hours. Triggered by the crystal defects that had been introduced into the particles in the previous treatment, a part or almost all of the phosphor particles were transformed-from hex agonal crystals to cubic crystals in the second firing, and in addition, the copper having been uniformly dispersed inside the particles in the first firing concentrated in the boundaries to form conductive layers that act for electroluminescence. Prior to the second firing, an activator and a co-activator may be supplied to the phosphor particles. After the second firing, the resulting intermediate phosphor was stirred in an aqueous 5% hydrochloric acid solution for 20 minutes to wash it. Further, this was washed with water and then an aqueous KCN solution to remove copper sulfide having remained on the surfaces of the particles. Next, this was washed with deionized water and thereafter heated and dried in an oven to obtain EL phosphor powder. The thus-obtained EL phosphor powder was photographed through SEM (secondary electronic microscope) to take a picture of the phosphor particles constituting it. 200 particles in the picture were analyzed to determine the length of the major axis, the length of the minor axis and the aspect ratio (length of major axis/length of minor axis) thereof.

EXAMPLES 2 TO 4

In Examples 2 to 4, EL phosphor powder was prepared in the same manner as in Example 1, for which, however, the amount of the α-alumina powder added was 39 g, 22 g, 11 g, respectively.

COMPARATIVE EXAMPLE 1

In the same manner as in Examples, EL phosphor powder was prepared, for which, however, α-alumina powder having a mean particle size of 0.6 μm was not added in the first firing. The EL phosphor powder contained many amorphous aggregates of phosphor particles, and the length of the major axis and the minor axis of many of them were difficult to determine.

TEST EXAMPLE 1

Light Emission Characteristic Test of Phosphor Powder

Fluororubber was dissolved in an organic solvent (isophorone) in a ratio by weight of 0.1 (rubber)/1 (solvent) to prepare a binder solution. Then, zinc sulfide phosphor was dispersed in the binder solution in a ratio by weight of 0.4 (phosphor)/1 (binder) to prepare a phosphor dispersion. The dispersion was applied onto a sheet of conductive film-coated glass to form a layer thereon having a thickness of 200 μm. Next, the coating layer was heated and dried at 170° C. to evaporate away the organic solvent, and a dried phosphor dispersion film was thus formed. Another sheet of conductive film-coated glass was put over the phosphor film to construct an EL device. An alternating current field of 120 V and 1 kHz was applied to the EL device at room temperature, and the relative brightness of the two EL devices was measured. The result is given in Table 1.

TABLE 1

| | Proportion of the projected area of the particles having an aspect ratio of at least 1.5 to the projected area of all the particles (%) | Particles having an aspect ratio of at least 1.5 | | | Relative brightness |
|---|---|---|---|---|---|
| | | Mean aspect ratio | Mean length of major axis (μm) | Mean length of minor axis (μm) | |
| Example 1 | 95 | 4.5 | 30 | 6.7 | 260 |
| Example 2 | 80 | 3.5 | 28 | 8 | 210 |
| Example 3 | 60 | 2.5 | 30 | 12 | 140 |
| Example 4 | 40 | 1.7 | 34 | 20 | 120 |
| Comparative Example 1 | 5 | 1.7 | 35 | 25 | 100 |

As described hereinabove, the EL devices containing the phosphor powder of the invention, which contains at least 30% of particles having an aspect ratio (length of major axis/length of minor axis) of at least 1.5, emitted light of higher brightness. More preferably, the particles having an aspect ratio of at least 1.5 have a mean aspect ratio of at least 2.

The present disclosure relates to the subject matter contained in Japanese Patent Application No. 297228/2002 filed Oct. 10, 2002, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. EL phosphor powder which contains phosphor particles that comprise zinc sulfide as the matrix thereof and contain an activator and a co-activator, wherein at least 30% of the projected area of the phosphor particles contained in the EL phosphor powder are those having an aspect ratio (length of major axis/length of minor axis) of at least 1.5.

2. The EL phosphor powder according to claim 1, wherein at least 50% of the projected area of the phosphor particles contained in the EL phosphor powder are those having an aspect ratio (length of major axis/length of minor axis) of at least 1.5.

3. The EL phosphor powder according to claim 1, wherein at least 70% of the projected area of the phosphor particles contained in the EL phosphor powder are those having an aspect ratio (length of major axis/length of minor axis) of at least 1.5.

4. The EL phosphor powder according to claim 1, wherein the mean aspect ratio (length of major axis/length of minor axis) of the phosphor particles having an aspect ratio (length of major axis/length of minor axis) of at least 1.5 is at least 2.

5. The EL phosphor powder according to claim 1, wherein the mean aspect ratio (length of major axis/length of minor axis) of the phosphor particles having an aspect ratio (length of major axis/length of minor axis) of at least 1.5 is at least 3.

6. The EL phosphor powder according to claim 1, wherein the EL phosphor particles have real stacking defects and the mean spacing of the stacking defects is from 0.5 to 20 nm.

7. The EL phosphor powder according to claim 1, wherein the activator is at least one ion selected from the group consisting of copper, manganese, silver, gold and rare earth elements.

8. The EL phosphor powder according to claim 1, wherein the co-activator is at least one ion selected from the group consisting of chlorine, bromine, iodine and aluminium.

9. The EL phosphor powder according to claim 1, wherein the activator is copper ion and the co-activator is chloride ion.

10. The EL phosphor powder according to claim 1, wherein the mean length of the major axis of the EL phosphor particles having an aspect ratio (length of major axis/length of minor axis) of at least 1.5 is at most 100 $\mu$m.

11. An EL device comprising the EL phosphor powder according to claim 1.

* * * * *